(12) United States Patent
Buccicone et al.

(10) Patent No.: US 7,686,346 B1
(45) Date of Patent: Mar. 30, 2010

(54) TRANSITION TEE COUPLING

(75) Inventors: Dana F. Buccicone, Goshen, IN (US);
Larry W. Johnson, Madison, CT (US)

(73) Assignee: Elkhart Products Corporation, Langbroek (NL)

( * ) Notice: Subject to any disclaimer, the term of this patent is extended or adjusted under 35 U.S.C. 154(b) by 737 days.

(21) Appl. No.: 11/491,476

(22) Filed: Jul. 21, 2006

(51) Int. Cl.
*F16L 41/00* (2006.01)
(52) U.S. Cl. .............. 285/133.21; 285/133.3; 285/129.1; 285/340
(58) Field of Classification Search .............. 285/133.2, 285/133.3, 133.11, 129.11, 340
See application file for complete search history.

(56) References Cited

U.S. PATENT DOCUMENTS

| | | | | |
|---|---|---|---|---|
| 1,747,942 A | * | 2/1930 | Lanninger | 285/133.21 |
| 1,781,581 A | * | 11/1930 | Hellyer | 285/133.21 |
| 2,672,356 A | * | 3/1954 | Crockett | 285/133.21 |
| 2,898,128 A | * | 8/1959 | Shohan | 285/133.21 |
| 2,921,801 A | * | 1/1960 | Beyer | 285/133.21 |
| 3,596,939 A | * | 8/1971 | Gibson | 285/133.21 |
| 3,638,972 A | * | 2/1972 | Alpine | 285/133.21 |
| 3,820,826 A | * | 6/1974 | Ligon et al. | 285/133.21 |
| 3,869,154 A | * | 3/1975 | Sanchez | 285/133.21 |
| 3,924,881 A | * | 12/1975 | O'Connor | 285/133.21 |
| 4,130,302 A | * | 12/1978 | Mitchell et al. | 285/133.21 |
| 4,776,616 A | * | 10/1988 | Umehara et al. | 285/133.21 |
| 4,978,148 A | * | 12/1990 | Kosugi et al. | 285/133.11 |
| 5,046,765 A | * | 9/1991 | Usui | 285/133.21 |
| 5,090,743 A | * | 2/1992 | Obering | 285/133.21 |
| 5,248,171 A | * | 9/1993 | Briet | 285/133.3 |
| 5,464,257 A | * | 11/1995 | Riddles et al. | 285/133.21 |
| 5,799,986 A | * | 9/1998 | Corbett et al. | 285/133.21 |
| 7,472,931 B2 | * | 1/2009 | Kerin et al. | 285/133.3 |

FOREIGN PATENT DOCUMENTS

DE    3703841 A1 *    8/1988

* cited by examiner

*Primary Examiner*—David E Bochna
(74) *Attorney, Agent, or Firm*—Fulbright & Jaworski L.L.P.

(57) ABSTRACT

An improved coupling, such as a transition tee coupling, is described having press-connect fittings on the ends and a push-connect fitting on the outlet. The improved transition tee coupling is formed using a reduced-outlet tee having press-connect fittings on all three sockets. An unfinished end of a tailpiece having a push-connect fitting on the opposite end is inserted into the outlet socket of the press-connect tee. The press-connect fitting of the outlet tee is crimped using a special press tool jaw that does not damage the push fitting on the tailpiece.

13 Claims, 4 Drawing Sheets

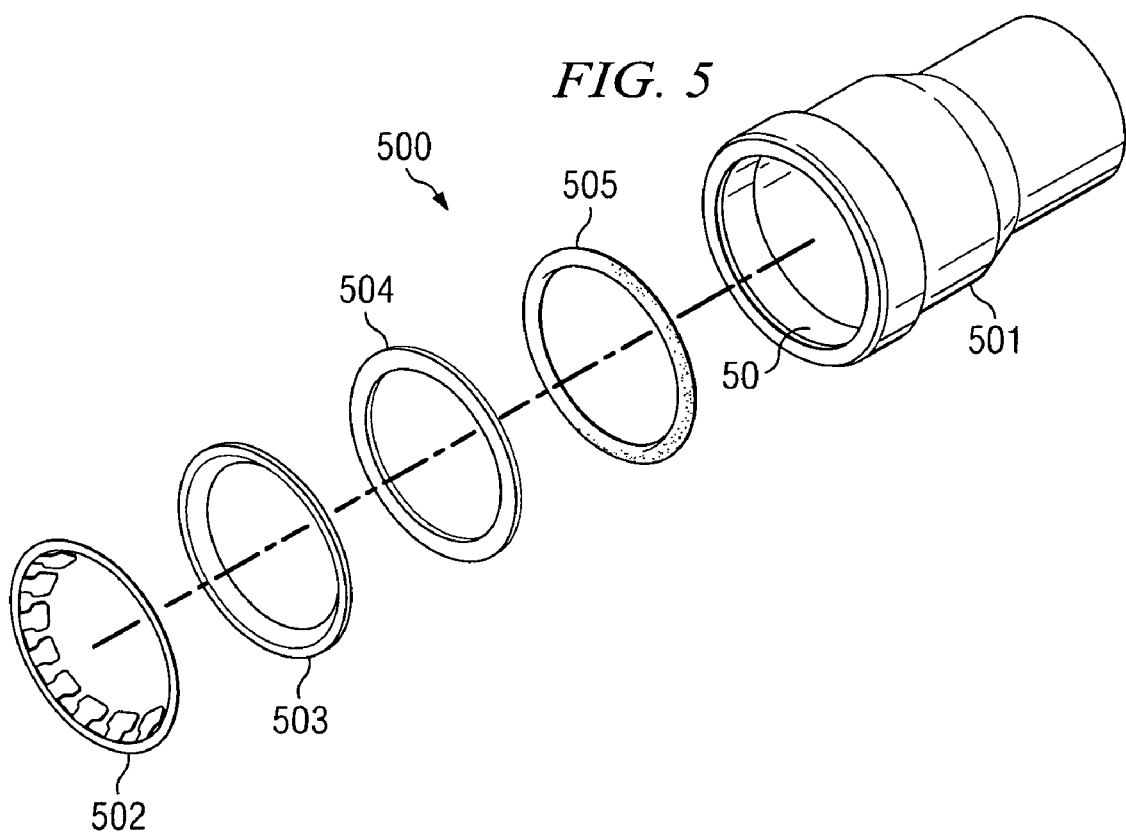

TRANSITION TEE COUPLING

TECHNICAL FIELD

The present invention relates in general to plumbing products and, more particularly, to tee couplings or pipe fittings having a combination of press-connection and push-connection sockets.

BACKGROUND OF THE INVENTION

Press copper fittings provide secure, reliable joints for plumbing connections. Specially engineered O-rings in the sockets of the fitting are tightened onto the tube or piping using a press-fit tool. A watertight seal is created by applying pressure from the press-fit tool, which tightens the O-ring onto the tube, ensuring a perfect fit.

Using press fittings, plumbers can install tubing and pipes with less trouble in less time and effort than what is required when using other methods, such as soldered or threaded fittings. Press fittings allow plumbers to spend less time on site. With press fittings, plumbers create strong, long-lasting joints with significant time savings, especially on large-diameter applications. The installation process bypasses the need for extensive tube preparation and time-consuming material use. Additionally, using press fittings requires fewer accessories and allows plumbers to avoid purchasing, storing and carrying accessory materials, such as gases, fluxes, solders, adhesives, threading machines and related materials and equipment. To install press fittings, the plumber needs only a press tool and the appropriate size jaws.

In addition to press fittings that require a pressing tool to form a joint, push fittings are also available to plumbers. Push fittings do not require a pressing tool to join the fitting to tubing. Instead, a toothed grab ring in the push fitting locks onto the tubing and holds it in place in the fitting socket. An O-ring in the push fitting forms a watertight seal. When installing push fittings, a plumber simply has to push the tubing into the socket and a joint is formed without further pressing, solder or adhesive.

The installation of press fittings or push fittings is intrinsically clean and creates no mess. No extra site cleanup is needed once the job is done, and there is never a chance for adhesive, flux or solder to contaminate the bore because those materials are not needed and never used with press or push fittings.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF SUMMARY OF THE INVENTION

When using press fittings on an installation, plumbers must change the jaw in the pressing tool to fit the size of the fitting and the tubing being installed. For example, when installing press-connection reduced-outlet tees, after making the end connections, a plumber must change the jaw in the pressing tool to make the smaller size outlet pipe connection. One jaw size must be used to press the two joints for the runs, and a second jaw size is required to press the outlet joint. These jaw changes require a delay in the installation and must be made for every fitting with two different sizes of press-connect fittings. On large jobs, many such jaw changes are required and result in a longer installation time for the project.

It has been observed that the installation time for fittings with different-sized outlets, such as reduced-outlet tees, can be shortened if the fitting has a combination of press-connect and push-connect sockets. The present invention is directed to a transition tee having press-connect fittings on the two runs that are joined to tubing using a press connect tool. The transition tee of the present invention has a push-connect fitting on the reduced-size outlet socket that is joined to tubing simply by inserting the tubing into the socket, without changing the jaw on a press connect tool and without having to press the joint.

In one embodiment of the invention, the reduced-outlet transition tee is formed using a reduced-outlet tee that has press-connect fittings on each socket. A tailpiece is joined to the outlet socket of the press-connect tee to form the final reduced-outlet transition tee. The tailpiece has one unfinished end that is adapted to be joined to the outlet socket of the reduced-outlet tee and one end that has a push-connect fitting. When permanently joined, the tailpiece and reduced-outlet tee create a coupling that has press-connect fittings on each end socket and a push-connect fitting on the outlet socket. The reduced-outlet transition tee is provided to plumbers as a single unit, thereby allowing the plumbers to install the fittings using a single press-connect jaw size.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

BRIEF DESCRIPTION OF THE DRAWINGS

FIG. 5 is a exploded isometric view illustrating the components of an exemplary push-connect fitting.

DETAILED DESCRIPTION OF THE INVENTION

Figure 1A:
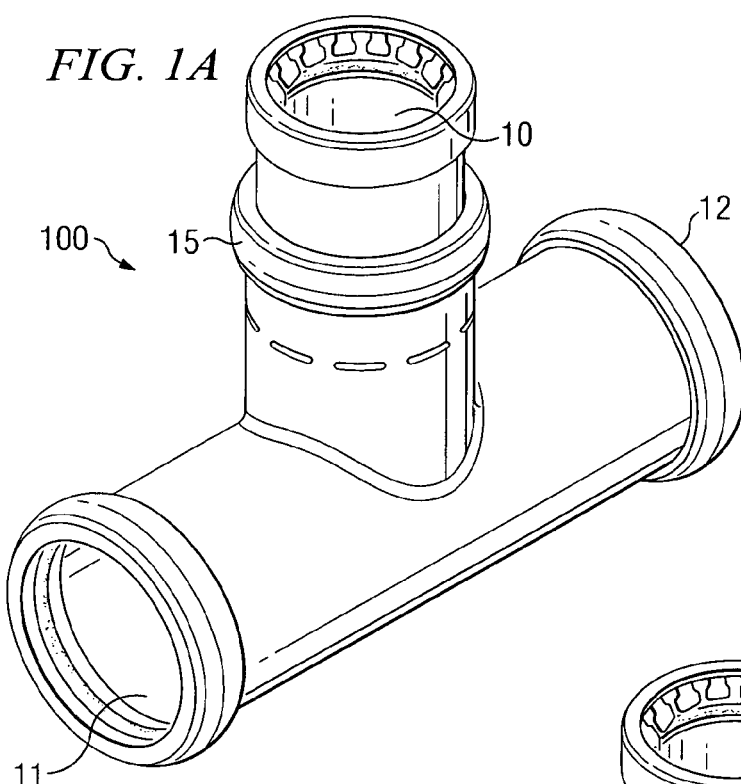
FIG. 1A is an isometric view of an improved transition tee according to one embodiment of the present invention.
Figure 1B:
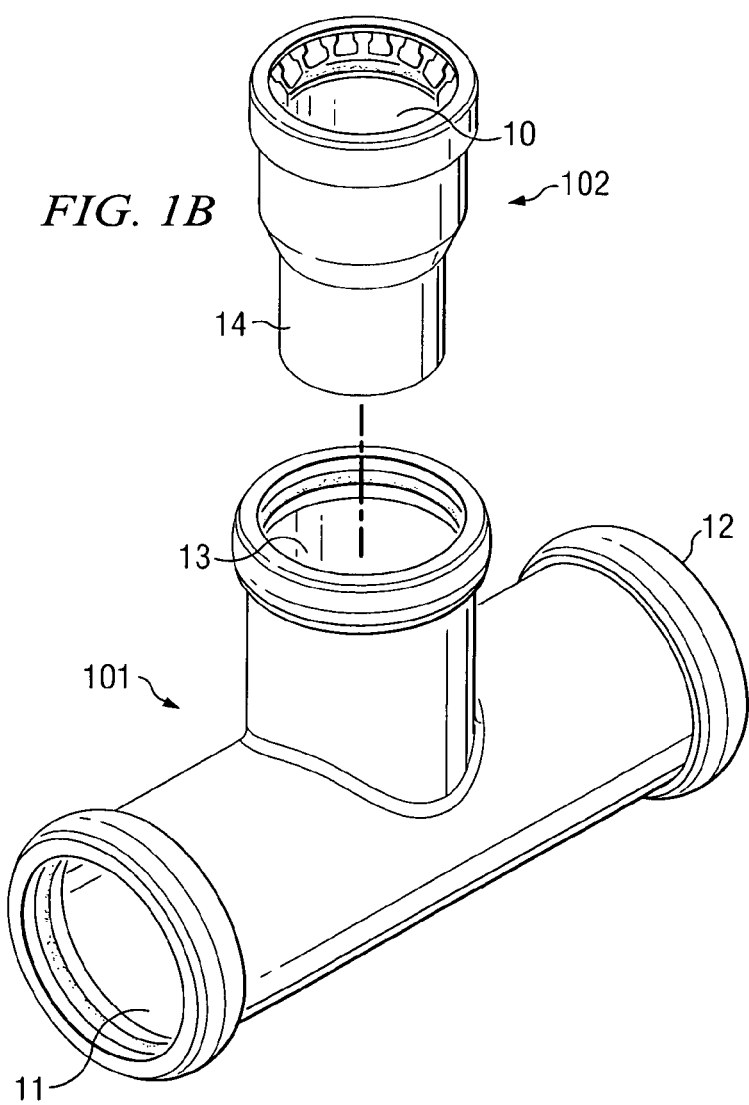
FIG. 1B is an exploded isometric view illustrating components of an improved transition tee according to one embodiment of the present invention.
Figure 2A:
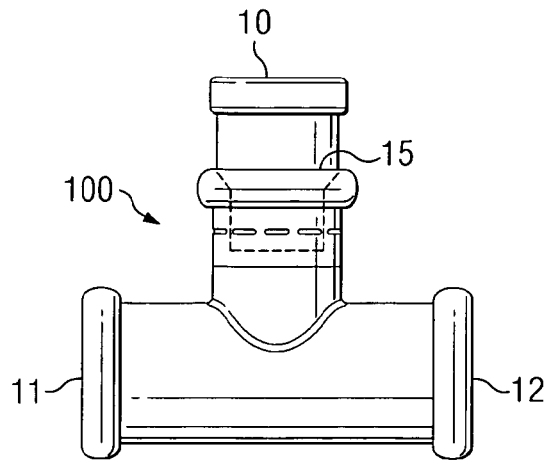
FIG. 2A is an side view of an improved transition tee according to one embodiment of the present invention.
Figure 2B:
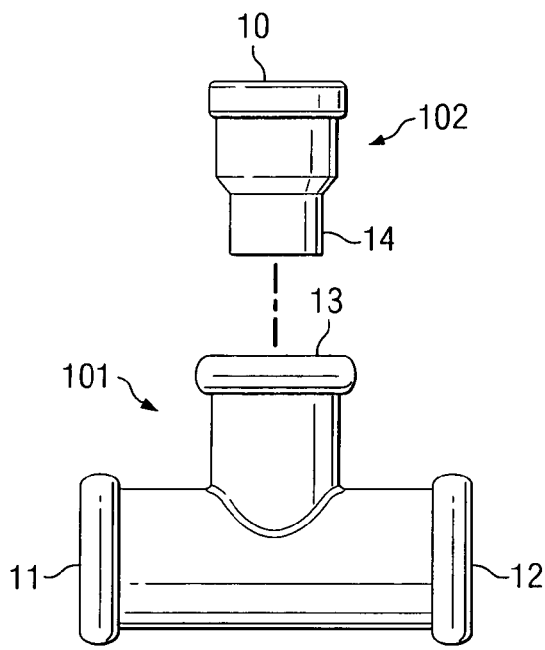
FIG. 2B is an exploded side view illustrating components of an improved transition tee according to one embodiment of the present invention.

FIG. 1A is an isometric view of tee coupling 100 incorporating one embodiment of the present invention. FIG. 2A is a side view of coupling 100. Tee coupling 100 is a transition tee having outlet socket 10 with a diameter that is smaller than the diameter of end sockets 11, 12. Outlet socket 10 is a push fitting, and end sockets 11, 12 are press-fittings. FIGS. 1B and 2B illustrate the main components of transition tee coupling 100, including press-fitting tee 101 and push-fitting tailpiece 102. Press fitting tee 101 includes outlet socket 13, which is a standard press fitting that receives fit end 14 of tailpiece 102.

The invention illustrated in FIGS. 1 and 2 consists of a transition tee created using existing press-connect and push-connect fitting technology to eliminate the need to change press-connect jaw tooling during installation of a reducer tee coupling. The result is an improved reducer tee that has press-connect sockets that use a single press tool jaw, and an outlet socket that does not require a press tool to form the joint. A plumber using the improved reducer tee saves time by needing to press only two of the three joints of the tee and using the same size press tool jaw for both joints.

Push-connect fitting 10 uses a grab ring and O-ring combination to hold and seal tubing within the fitting. A joint is formed simply by inserting tubing into the fitting. No special tools are required. Removable and non-removable push-connect fittings are known and useable with the present invention. It is anticipated that non-removable push-connect fittings would be used for most embodiments of the present invention. Press-connect fitting 13 forms a permanent joint when crimped using a press tool. Press-connect fitting 13 contains an O-ring that provides a seal in the area that is compressed to form the joint.

In one embodiment, press-connect reduced outlet tee 11 may be an Elkhart Products Corporation (EPC®) XPress® ¾"x¾"x½" tee. Reduced outlet tee 101 has XPress® fittings on all three sockets 11, 12, 13. Tailpiece 102 has a ½" EPC® QTITE® push-connect fitting in socket 13. Fit end 14 of tailpiece 102 is adapted to fit into socket 13 of tee 101. Using these two components, fit end 14 of tailpiece 101 is inserted into press-connect outlet 13 of tee 101. A press-connect joint is then made using a specially designed press tool, such as a RIDGID® press tool with a modified RIDGID® Standard Hex Profile (SHP®) jaw.

Typically, the opening in the SHP® jaw has a groove that is designed to fit over the seal bead on a press fitting and two hexagonal shaped surfaces on either side of the groove. The pressing jaw that is used to manufacture improved reducer tee 100 must be modified so that it creates a press joint only on one side of the seal bead at outlet 13 of reducer tee 101. A standard pressing jaw with two sides will not create a functional outlet press joint 15 on improved transition tee 100 because it would damage the cup on EPC® QTITE® tailpiece 102. Accordingly, a unique press tool configuration must used, such as the press jaw illustrated in FIGS. 3A and 3B. In the preferred embodiment, this modified tool would be used to create press joint 15 only during the manufacture of improved reducer tee 100. The modified press tool would not be sold to plumbers or other users of press fittings. Instead, only the fittings would be available for sale.

Figure 3A:
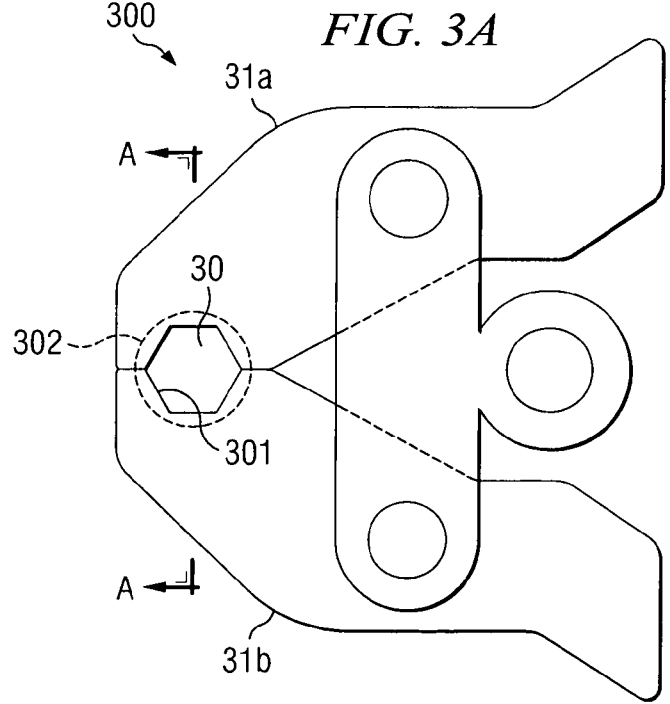
FIG. 3A illustrates a jaw for a press tool used in embodiments of the present invention.
Figure 3B:
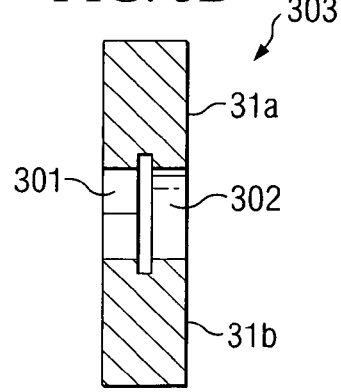
FIG. 3B is a cross section of the press tool jaw illustrated in FIG. 3A.

FIG. 3A illustrates press jaw 300, which may be, for example, a RIDGID® ½" SHP® jaw that is modified for use with the present invention. In operation, a press fitting is placed in opening 30 between arms 31a and 31b. The press fitting tool drives the jaws together so that the press joint is formed by areas 301 and 302. FIG. 3B illustrates cross section 303 of jaw 300 along line A-A. In the present invention, area 301 has a SHP® hex shape, and surface 302 has a cylindrical shape. When used to form joint 15 on improved transition tee 100, area 301 presses on press connect 13 to crimp the joint, while area 302 is adapted to fit around tailpiece 102 without damaging push fitting 10.

Press tool jaws from other manufacturers may also be modified, as outlined above, to have a one-sided hex opening. Although a RIDGID® jaw is discussed above, press jaws manufactured by Rothenberger®, Klauke®, REMS® or other manufacturers may also be used. Press jaws from Rothenberger®, Klauke® and REMS® are all approved for use with the XPress® press-connect fitting and all can be modified as discussed herein to produce the desired press joint for an improved transition fitting.

Figure 4A:
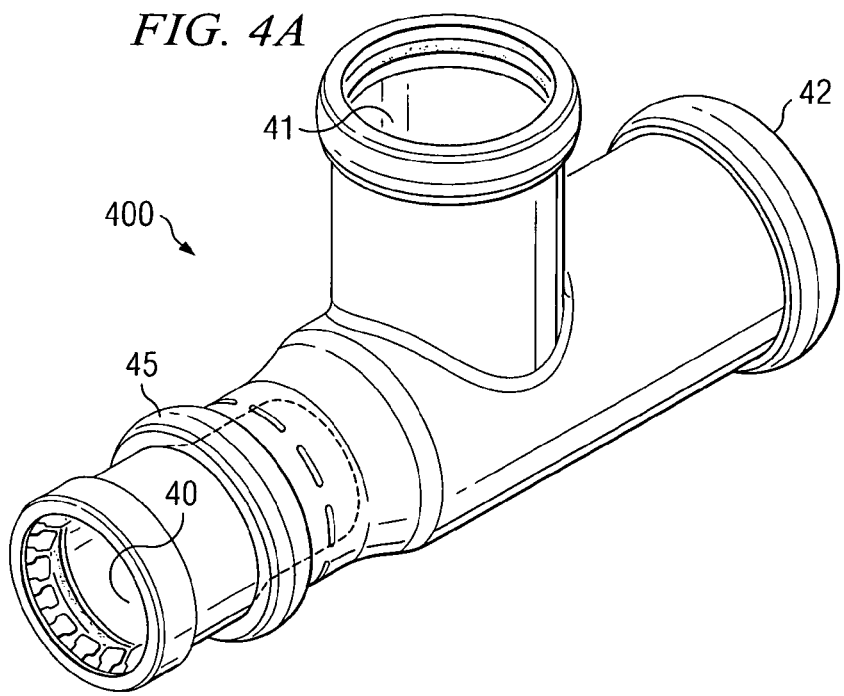
FIG. 4A is an isometric view of an improved transition tee according to an alternative embodiment of the present invention.
Figure 4B:
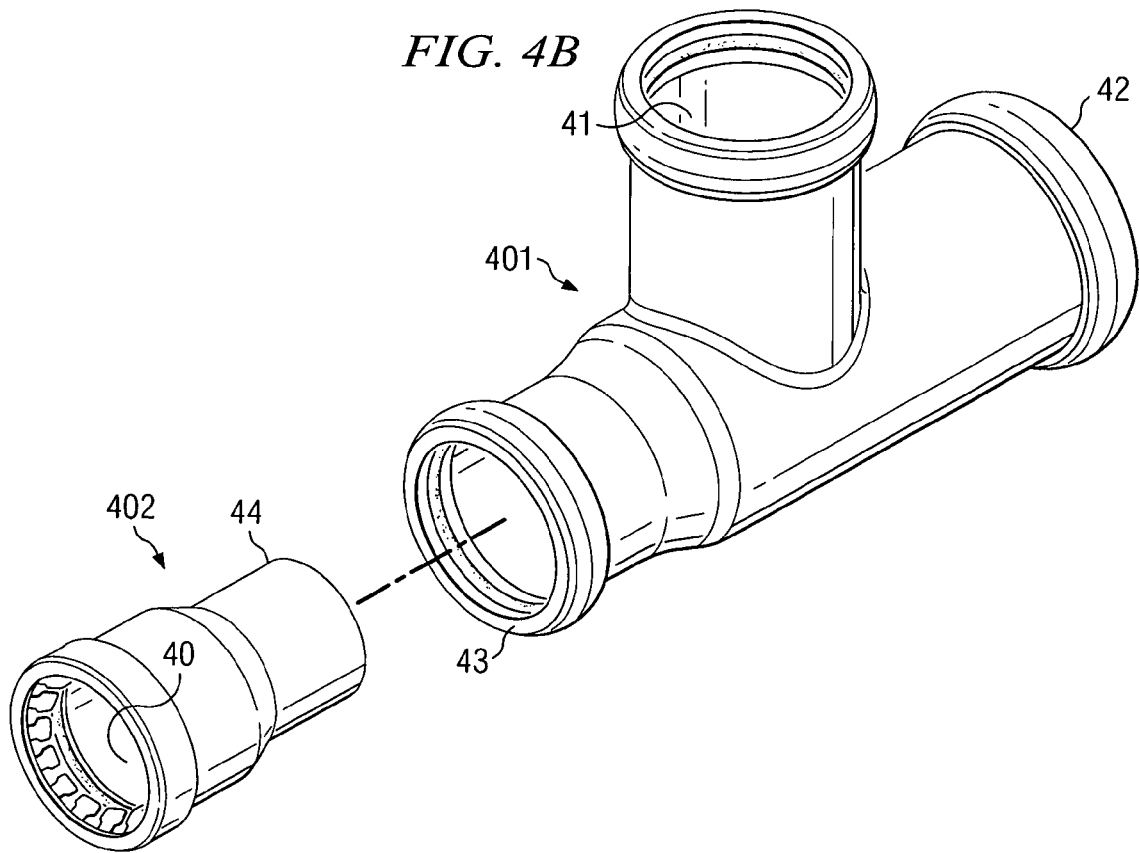
FIG. 4B is an exploded isometric view illustrating components of an improved transition tee according to an alternative embodiment of the present invention.

It will be understood by those of skill in the art that the present invention is not limited to reduced-outlet tees. Instead, the present invention can be adapted for use with any press-connect fitting that has sockets of two or more sizes. For example, FIGS. 4A and 4B illustrate an alternative embodiment of the present invention based upon a reduced-run tee. FIG. 4A is an isometric view of tee coupling 400. FIG. 4B an exploded view of coupling 400 showing press-fitting reduced-run tee 401 and push-fitting tailpiece 402. Tee coupling 401 is a transition tee having end run socket 43 with a diameter that is smaller than the diameter of inlet socket 41 and outlet 41. Outlet socket 40 is a push-connect fitting, while end socket 41 and outlet 42 are press-connect fittings. Press fitting tee 401 includes outlet socket 43, which is a press-connect fitting that is adapted to receive fit end 44 of tailpiece 402.

Like the tee shown in FIGS. 1 and 2, reduced-run tee 400 consists of a transition tee created using existing press-connect and push-connect fitting technology to eliminate the need to change press-connect jaw tooling during installation of a reducer tee coupling. The result is an improved reducer tee that allows a plumber to save time by pressing only two of the three joints of the tee and using the same size press tool jaw for both joints.

Push-connect fitting 40 uses a grab ring and O-ring combination to hold and seal tubing within the fitting. A joint is formed by inserting tubing into the fitting. No special tools are required. Removable and non-removable push-connect fittings are known and useable with the present invention. It is anticipated that non-removable push-connect fittings would be used for most embodiments of the present invention. Press-connect fitting 43 is a permanent joint when crimped using a press tool. Press-connect fitting 43 contains an O-ring that provides a seal in the area that is compressed to form the joint.

FIG. 5 is a exploded isometric view illustrating the components of exemplary push-connect coupling 500. Fitting 501, such as a tailpiece (as illustrated) or any other fitting, has socket 50 adapted to hold components 502-505. Toothed grab ring 502 is supported by protection ring 503, which is adjacent to O-ring 505. Flat washer 504 may be placed between O-ring 505 and protection ring 503. Components 502-505 are placed in socket 50 and held in place by forming a lip or rim on the outside edge of socket 50. When push-connect fitting 500 is assembled, tubing inserted into socket 50 will be held in place by grab ring 502. O-ring 505 forms a seal between the tubing and socket 50. There is no need for crimping with a press-tool to form a seal when using push-fitting 500. It will be understood by those of skill in the art that the present invention will work with any type of push-connect fitting, such as those illustrated in FIG. 5 or any other push-connect fitting.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A tee connection coupling comprising:
   a first socket having a first press fitting;
   a second socket having a second press fitting, wherein the first press fitting and second press fitting including an O-ring seal and requiring a press tool to press-connect each press-fit joint; and
   a third socket having a push fitting, the push fitting including a grab ring having a plurality of sharpened teeth and an O-ring, the push fitting able to form a push-fit joint without the use of a press-connect tool, the push fit joint using the grab ring to deform the surface of an inserted pipe end when engaged, such that the grab ring engagement with the inserted pipe prevents the removal of the inserted pipe and the O-ring forms a seal with the inserted pipe.

2. The coupling of claim 1 wherein the O-ring of the first and second press fitting is recessed in a groove adjacent to an opening in the socket.

3. The coupling of claim 1 wherein the push fitting further comprises:
   a protection ring preventing the grab ring from damaging the O-ring during engagement.

4. The coupling of claim 1 wherein said push fitting comprises:
   a push connection tailpiece permanently installed in an outlet socket of the tee connection forming the third socket by a press connection.

5. The coupling of claim 1 wherein the press fitting of the first and second sockets are adapted to be coupled to piping having a first diameter; and
   wherein the push fitting of the third socket is adapted to be coupled to piping have a second diameter.

6. The coupling of claim 5 wherein the second diameter is smaller than the first diameter.

7. The coupling of claim 1 wherein the coupling is a reduced-outlet tee or a reduced-run tee.

8. A coupling comprising:
   a first socket having a first press fitting;
   a second socket having a second press fitting, wherein each of the first press fitting and second press fitting including an O-ring seal in a seal bead and requiring a press tool to press-connect the joint; and
   a third socket having a push fitting, the push fitting including a grab ring and an O-ring, the push fitting able to form a joint without the use of a press-connect tool, the push fitting being formed by a tailpiece having a push connection end and a fit end where the fit end is inserted into a third press fitting in the third socket, the third press fitting including an O-ring in a third seal bead on the third press fitting, the tailpiece locked into the third socket by press connecting of the third press fitting with the fit end of the tail piece.

9. The coupling of claim 8 wherein the push fitting further comprises a protection ring preventing the grab ring from damaging the O-ring during engagement.

10. The coupling of claim 8 wherein the connecting of the third press fitting with the fit end of the tailpiece uses a tool designed to create a press joint on only one side of the third seal bead.

11. The coupling of claim 8 wherein the press fitting of the first and second sockets are adapted to be coupled to piping having a first diameter; and
    wherein the push fitting of the third socket is adapted to be coupled to piping have a second diameter.

12. The coupling of claim 11 wherein the second diameter is smaller than the first diameter.

13. The coupling of claim 8 wherein the coupling is a reduced-outlet tee or a reduced-run tee.

* * * * *